(12) United States Patent
Morisaki (10) Patent No.: US 12,091,158 B2
(45) Date of Patent: Sep. 17, 2024

(54) AIRFLOW CONTROL SYSTEM AND AIRCRAFT

(71) Applicant: MITSUBISHI HEAVY INDUSTRIES, LTD., Tokyo (JP)

(72) Inventor: Yuki Morisaki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/768,372

(22) PCT Filed: Feb. 12, 2020

(86) PCT No.: PCT/JP2020/005281
§ 371 (c)(1),
(2) Date: Apr. 12, 2022

(87) PCT Pub. No.: WO2021/075069
PCT Pub. Date: Apr. 22, 2021

(65) Prior Publication Data
US 2024/0109647 A1    Apr. 4, 2024

(30) Foreign Application Priority Data
Oct. 16, 2019    (JP) ................. 2019-189789

(51) Int. Cl.
*B64C 21/02*    (2006.01)
*B64C 21/01*    (2023.01)
*B64C 23/02*    (2006.01)

(52) U.S. Cl.
CPC ............ *B64C 21/025* (2013.01); *B64C 21/01* (2023.01); *B64C 23/02* (2013.01)

(58) Field of Classification Search
CPC ....... B64C 21/08; B64C 21/025; B64C 21/01; B64C 23/02
See application file for complete search history.

(56) References Cited

U.S. PATENT DOCUMENTS 9,587,585 B1 *  3/2017  Rolling ................. B64C 39/08
9,656,748 B2    5/2017  Jing
(Continued)

FOREIGN PATENT DOCUMENTS

CN    106458314     2/2017
CN    107264777    10/2017
(Continued)

OTHER PUBLICATIONS

Extended European Search Report issued Sep. 19, 2022 in European Patent Application No. 20876643.6.
(Continued)

*Primary Examiner* — Brady W Frazier
*Assistant Examiner* — Shanna Danielle Glover
(74) *Attorney, Agent, or Firm* — Wenderoth, Lind & Ponack, L.L.P.

(57) ABSTRACT

Provided is an airflow control system for controlling airflow flowing over an upper surface of an aircraft. The airflow control system includes: a blowout port that is provided on a forward side of the upper surface of the aircraft to blow out the airflow; a suction port that is provided closer to the forward side than the blowout port to suck outside air; a fan that is provided on a rearward side of the blowout port to suck air flowing from a forward side and to discharge the air to a rearward side; and a compressor that is provided in a channel extending from the suction port to the blowout port to increase pressure of the outside air sucked from the suction port and to pressure-feed the resulting outside air to the blowout port.

6 Claims, 10 Drawing Sheets

(56) References Cited

U.S. PATENT DOCUMENTS

| | | | |
|---|---|---|---|
| 2005/0029396 | A1 | 2/2005 | Englar et al. |
| 2011/0210211 | A1 | 9/2011 | Zha et al. |
| 2011/0229322 | A1 | 9/2011 | Tadayon et al. |
| 2012/0068020 | A1 | 3/2012 | Milde, Jr. |
| 2014/0061387 | A1* | 3/2014 | Reckzeh ................ B64C 21/04 244/209 |
| 2015/0298805 | A1 | 10/2015 | Jing |
| 2018/0016000 | A1 | 1/2018 | Pastouchenko et al. |
| 2018/0086437 | A1 | 3/2018 | Pastouchenko et al. |
| 2018/0339765 | A1 | 11/2018 | Epstein et al. |
| 2020/0115040 | A1* | 4/2020 | Giannini ................ B64C 9/18 |
| 2020/0277074 | A1* | 9/2020 | Nagel ..................... B64C 7/02 |

FOREIGN PATENT DOCUMENTS

| | | | | |
|---|---|---|---|---|
| GB | 2566956 A | * | 4/2019 | .......... B64C 21/025 |
| RU | 150 946 | | 3/2015 | |

OTHER PUBLICATIONS

International Search Report issued May 19, 2020 in International (PCT) Application No. PCT/JP2020/005281, with English translation.

Written Opinion of the International Searching Authority issued May 19, 2020 in International (PCT) Application No. PCT/JP2020/005281, with English translation.

Office Action issued Mar. 16, 2024 in Chinese Patent Application No. 202080072284.9, with English language translation (15 pages).

* cited by examiner

AIRFLOW CONTROL SYSTEM AND AIRCRAFT

FIELD

The present disclosure relates to an airflow control system and an aircraft.

BACKGROUND

In the related art, a co-flow jet system is known to improve lift characteristics by jetting airflow from a blowout port provided on a forward side of a main wing of an airframe, making the jetted airflow flow along an upper surface of the main wing, sucking the airflow with a suction port provided on a rearward side of the main wing of the airframe, making the sucked airflow flow toward the blowout port, and circulating the airflow (for example, see Patent Literature 1). In this system, a compressor is provided inside the airframe, and the airflow sucked from the suction port is pressure-fed toward the blowout port by this compressor.

CITATION LIST

Patent Literature

Patent Literature 1: U.S. Patent Application Publication No. 2011/0210211

SUMMARY

Technical Problem

However, in Patent Literature 1, it is necessary to provide a compressor inside the airframe, as well as to provide a pipe that connects the compressor and the suction port and a pipe that connects the compressor and the blowout port. In this case, as the distance between the blowout port and the suction port is increased, a length of a pipe channel is increased, resulting in an increase in pressure loss caused by the airflow flowing through the pipes. Therefore, a fuel efficiency of the aircraft may deteriorate due to an increase in weight caused by the increase in the length of the pipe channel and an increase in weight caused by an increase in discharge capacity of the compressor for pressure-feeding the airflow against the pressure loss.

Thus, an object of the present disclosure is to provide an airflow control system and an aircraft, which can improve lift characteristics while suppressing an increase in weight.

Solution to Problem

An airflow control system according to the present disclosure is for controlling airflow flowing over an upper surface of an aircraft. The airflow control system includes: a blowout port that is provided on a forward side of the upper surface of the aircraft to blow out the airflow; a suction port that is provided closer to the forward side than the blowout port to suck outside air; a fan that is provided on a rearward side of the blowout port to suck air flowing from a forward side and to discharge the air to a rearward side; and a compressor that is provided in a channel extending from the suction port to the blowout port to increase pressure of the outside air sucked from the suction port and to pressure-feed the resulting outside air to the blowout port.

The aircraft of the present disclosure includes the airflow control system described above and an aircraft main body equipped with the airflow control system.

Advantageous Effects of Invention

According to the present disclosure, it is possible to improve the lift characteristics while suppressing an increase in weight.

DESCRIPTION OF EMBODIMENTS

Hereinbelow, embodiments of the present invention will be described in detail with reference to the drawings. The present invention is not limited to these embodiments. Components in the following embodiments include those that are replaceable and easy to be replaced by those skilled in the art, or those that are substantially the same. Furthermore, the components described below can be combined as appropriate, and the individual embodiments can be combined in a case in which there are a plurality of embodiments.

First Embodiment

Figure 1:
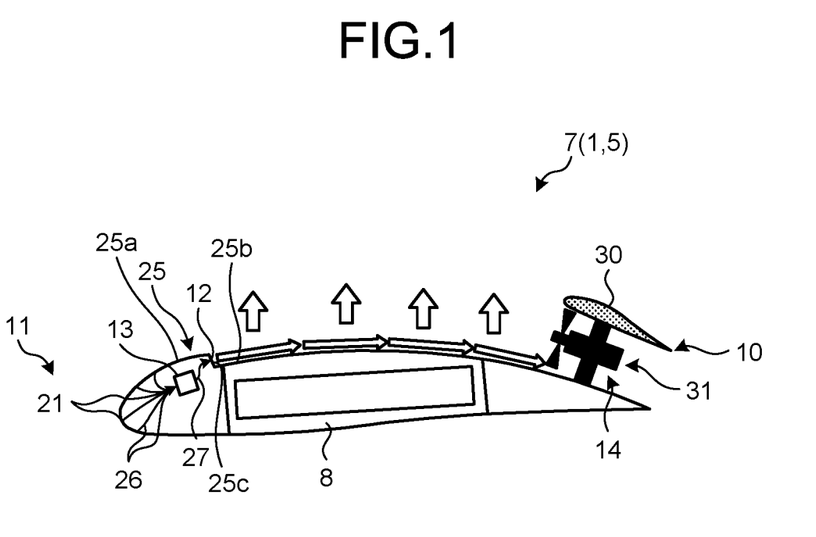
FIG. 1 is a schematic cross-sectional view illustrating a main wing of an aircraft equipped with an airflow control system according to a first embodiment.

An aircraft 1 according to a first embodiment is equipped with an airflow control system 10 that improves lift characteristics by making airflow flow along an upper surface of an airframe. FIG. 1 is a schematic cross-sectional view illustrating a main wing of the aircraft equipped with the airflow control system according to the first embodiment.

The aircraft 1 includes an aircraft main body 5 and the airflow control system 10. The aircraft main body 5 includes a fuselage 6 that is formed to extend in a roll direction and a main wing 7 that is provided to extend from the fuselage 6 in a pitch direction (width direction). The airflow control system 10 is provided in the main wing 7, or the fuselage 6 and the main wing 7. In the first embodiment, a case in which the airflow control system 10 is provided in the main wing 7 is described.

As illustrated in FIG. 1, the main wing 7 includes a structure 8 called a box beam, which is disposed on the center of the main wing 7 in a wing width direction (roll direction) where a leading edge side and a trailing edge side are connected. The leading edge side is a forward side of the aircraft 1 in the roll direction, and the trailing edge side is a rearward side of the aircraft 1 in the roll direction.

The airflow control system 10 includes a suction port 11, a blowout port 12, a compressor 13, and a fan 14.

The suction port 11 is provided on the leading edge side of the main wing 7 and is positioned closer to the leading edge side than the structure 8 is. The suction port 11 has a porous structure with a plurality of suction holes 21. The suction holes 21 are provided over from an upper surface side to a lower surface side on the leading edge side of the main wing 7. The suction holes 21 can suck a boundary layer formed over a surface of the leading edge side of the main wing 7.

The blowout port 12 is provided on an upper surface of the leading edge side of the main wing 7, provided on a trailing edge side of the suction port 11, and also positioned closer to the leading edge side than the structure 8 is. The blowout port 12 is formed such that the blown out airflow flows along the upper surface of the main wing 7. The blowout port 12 is formed, for example, on a step 25 formed on the leading edge side of the main wing 7. The step 25 is formed in a step shape composed of an upper surface 25a of the main wing 7, an inner surface 25b positioned inside the main wing 7 with respect to the upper surface 25a of the main wing 7, and a side surface 25c between the upper surface 25a on the leading edge side and the inner surface 25b on the trailing edge side. The blowout port 12 is formed on the side surface 25c. The blowout port 12 is provided over the main wing 7 in the pitch direction.

An air intake side of the compressor 13 is connected to an air intake side pipe 26 that is connected to the suction port 11, and an air discharge side of the compressor 13 is connected to an air discharge side pipe 27 that is connected to the blowout port 12. The compressor 13 takes outside air sucked from the suction port 11 therein, increases pressure of the taken outside air, and pressure-feeds the outside air whose pressure has been increased toward the blowout port 12. The pressure-fed outside air is then blown out from the blowout port 12 to be the airflow.

The fan 14 is provided on the upper surface of the trailing edge of the main wing 7, provided on a trailing edge side of the blowout port 12, and also positioned closer to the trailing edge side than the structure 8 is. The fan 14 is, for example, a propeller fan. The fan 14 is provided between the main wing 7 and a cowl 30 that is provided to face the upper surface of the main wing 7. The cowl 30 has a cross-section that is cut in a plane perpendicular to the pitch direction and formed in a wing shape, and is provided with a fan channel 31 through which the airflow flows between the cowl 30 and the upper surface of the main wing 7.

This airflow control system 10 sucks the outside air from the suction port 11. In this case, the suction port 11 sucks a boundary layer formed over the upper surface and a lower surface of the main wing 7, on the leading edge side of the main wing 7. The airflow control system 10 then introduces the sucked outside air into the compressor 13 through the air intake side pipe 26. The airflow control system 10 increases the pressure of the outside air by the compressor 13 and blows out the outside air whose pressure has been increased from the blowout port 12 through the air discharge side pipe 27, as the airflow. The blown airflow flows from the leading edge side toward the trailing edge side along the upper surface of the main wing 7, thereby improving the lift characteristics of the main wing 7. That is, an upstream of the airflow in a flow direction is a leading edge side, and a downstream in the flow direction is a trailing edge side. In this case, the airflow flows over the structure 8 of the main wing 7 and at least a part of the airflow flows into the fan channel 31. The airflow control system 10 sucks the airflow flowing into the fan channel 31 by the fan 14. The airflow control system 10 discharges the sucked airflow by the fan 14 from the downstream that is an air discharge side of the fan channel 31 to the outside.

As described above, according to the first embodiment, since the suction port 11 and the blowout port 12 are formed on the leading edge side of the main wing 7, the channel between the suction port 11 and blowout port 12, that is, a length of the air intake side pipe 26 and a length of the air discharge side pipe 27 can be shortened. Therefore, channel resistance in the pipes can be reduced, and an increase in pressure loss in the pipes can be suppressed. As a result, it is possible to suppress an increase in discharge capacity of the compressor 13. Thus, since an increase in weight of the pipes and an increase in weight of the compressor 13 can be suppressed, deterioration of a fuel consumption of the aircraft 1 can be suppressed. In addition, since the airflow flows along the upper surface of the main wing 7, the lift characteristics can be improved.

In addition, according to the first embodiment, the suction port 11 has the porous structure formed of the plurality of suction holes 21, and the plurality of suction holes 21 can be provided over from the upper surface side to the lower surface side of the main wing 7. Therefore, since the boundary layer formed on the leading edge side of the main wing 7 can be sucked by the plurality of suction holes 21, aerodynamic drag on the main wing 7 can be suppressed.

Second Embodiment

Figure 2:
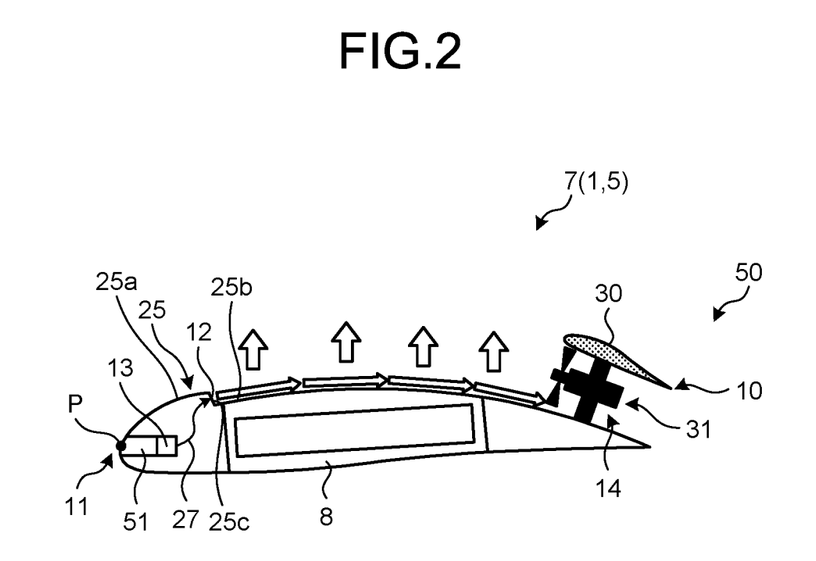
FIG. 2 is a schematic cross-sectional view illustrating a main wing of an aircraft equipped with an airflow control system according to a second embodiment.

Next, referring to FIG. 2, an airflow control system 50 according to a second embodiment will be described. In the second embodiment, in order to avoid the redundant description, components that are different from those of the first embodiment will be described, and components that have the same configuration as those of the first embodiment will be described with the same reference numerals and signs. FIG. 2 is a schematic cross-sectional view illustrating a main wing of an aircraft equipped with an airflow control system according to the second embodiment.

The airflow control system 50 of the second embodiment includes a suction port 51 illustrated in FIG. 2 instead of the suction port 11 having the porous structure according to the first embodiment. The suction port 51 in FIG. 2 has an opening shape (suction opening) formed on the leading edge side of the main wing 7. Here, in the cross-section cut in a plane perpendicular to the pitch direction of the main wing 7, in a case in which the suction port 51 is not provided, a point where the airflow diverges to the upper surface side and the lower surface side of the main wing 7 when the airflow blows against the leading edge side of the main wing 7 is a virtual stagnation point P. In this case, the suction port 51 of the second embodiment is provided at the virtual stagnation point P. That is, the suction port 51 is formed such that an area including the virtual stagnation point is an opening portion. This suction port 51 is formed to extend in the pitch direction of the main wing 7. Since the suction port 51 is formed to communicate with the air intake side of the compressor 13, the airflow control system 50 has a configuration in which the air intake side pipe 26 of the first embodiment is not included.

This airflow control system 50 sucks the outside air from the suction port 51. In this case, since the suction port 51 is provided at the virtual stagnation point P on the leading edge side of the main wing 7, the suction port 51 takes the outside air blowing against the leading edge side of the main wing 7 without forming a stagnation point that is generated on the leading edge side of the main wing 7.

The virtual stagnation point P may be a stagnation point during the flight of the aircraft 1 or may be a stagnation point during takeoff and landing of the aircraft 1, and is not limited to any particular case.

As described above, according to the second embodiment, since the stagnation point is not generated on the leading edge side of the main wing 7, the resistance of the outside air blowing against the main wing 7 can be reduced.

Third Embodiment

Figure 3:
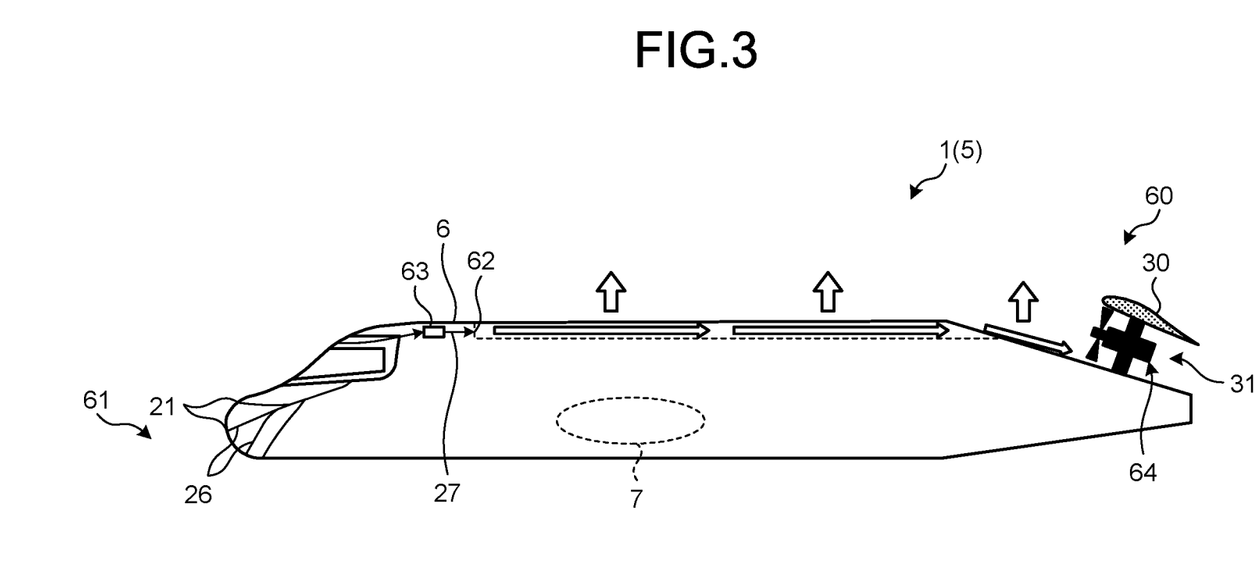
FIG. 3 is a schematic cross-sectional view illustrating a fuselage of an aircraft equipped with an airflow control system according to a third embodiment.

Next, referring to FIG. 3, an airflow control system 60 according to a third embodiment will be described. In the third embodiment, in order to avoid the redundant description, components that are different from those of the first embodiment and the second embodiment will be described, and components that have the same configuration as those of the first embodiment and the second embodiment will be described with the same reference numerals and signs. FIG. 3 is a schematic cross-sectional view illustrating a fuselage of an aircraft equipped with an airflow control system according to the third embodiment.

The airflow control system 60 of the third embodiment is applied to the fuselage 6 of the aircraft main body 5 instead of the main wing 7 of the first embodiment.

The airflow control system 60 of the third embodiment includes a suction port 61, a blowout port 62, a compressor 63, and a fan 64. The suction port 61 has a porous structure as in the first embodiment, and is provided on the nose side of the aircraft, which is the forward side of the fuselage 6 and provided closer to the forward side than the main wing 7 is. The blowout port 62 is provided on the nose side of the aircraft, which is the forward side of the fuselage 6, provided closer to the rearward side than the suction port 61 is, and provided closer to the forward side than the main wing 7 is. The blowout port 62 is formed in a step as in the first embodiment. Similar to the first embodiment, an air intake side of the compressor 63 is connected to the air intake side pipe 26, and an air discharge side of the compressor 63 is connected to the air discharge side pipe 27. The fan 64 is a propeller fan as in the first embodiment, provided on the nose side of the aircraft, which is the rearward side of the fuselage 6, and provided closer to the rearward side than the main wing 7 is. Since the airflow control system 60 of the third embodiment has the configuration in which the airflow control system 10 of the first embodiment is applied to the fuselage 6 of the aircraft main body 5, other configurations are almost the same as those of the first embodiment.

This airflow control system 60 sucks the outside air from the suction port 61. At this time, the suction port 61 sucks a boundary layer formed over an upper surface and a lower surface of the fuselage 6 on the forward side of the fuselage 6. The airflow control system 60 then introduces the sucked outside air into the compressor 63 via the air intake side pipe 26. The airflow control system 60 increases the pressure of the outside air by the compressor 63 and blows out the outside air whose pressure has been increased from the blowout port 62 through the air discharge side pipe 27, as the airflow. The blown airflow flows from the leading edge side toward the trailing edge side along the upper surface of the fuselage 6, thereby improving the lift characteristics of the fuselage 6. That is, an upstream of the airflow in a flow direction is a leading edge side, and a downstream in the flow direction is a trailing edge side. At least a part of the airflow flowing along the upper surface of the fuselage 6 flows into the fan channel 31. The airflow control system 60 sucks the airflow flowing into the fan channel 31 by the fan 64. The airflow control system 60 discharges the sucked airflow by the fan 64 from the downstream that is an air discharge side of the fan channel 31 to the outside.

As described above, according to the third embodiment, even in the case in which the airflow control system 60 is applied to the fuselage 6, since an increase in weight of the pipes and an increase in weight of the compressor 13 can be suppressed, deterioration of a fuel consumption of the aircraft 1 can be suppressed. In addition, since the airflow flows along the upper surface of the fuselage 6, the lift characteristics can be improved.

The airflow control system 60 of the third embodiment may be combined with the airflow control system 10 of the first embodiment, or may be combined with the airflow control system 50 of the second embodiment.

Fourth Embodiment

Figure 4:
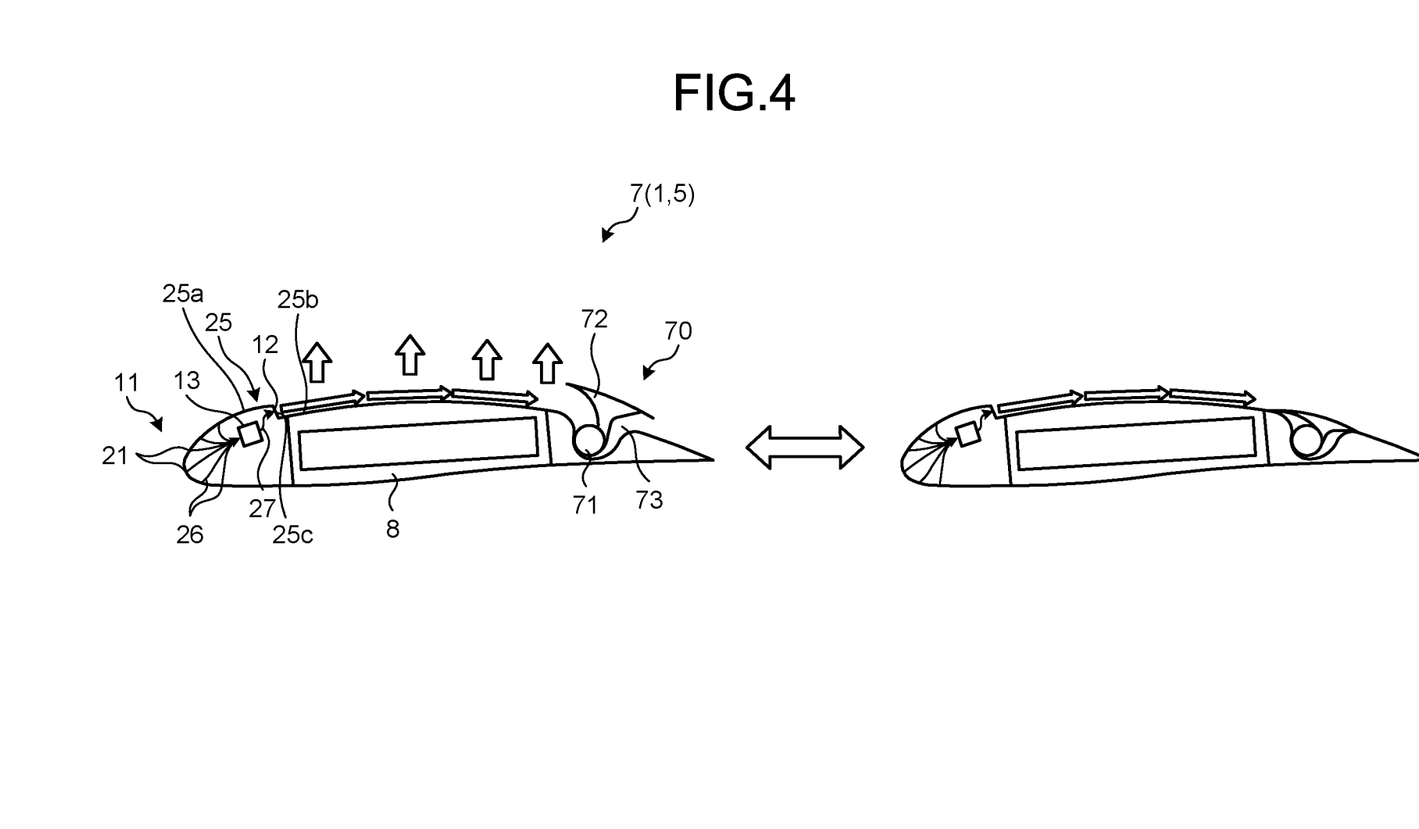
FIG. 4 is a schematic cross-sectional view illustrating a main wing of an aircraft equipped with an airflow control system according to a fourth embodiment.

Next, referring to FIG. 4, an airflow control system 70 according to a fourth embodiment will be described. In the fourth embodiment, also in order to avoid the redundant description, components that are different from those of the first to third embodiments will be described, and components that have the same configuration as those of the first to third embodiments will be described with the same reference numerals and signs. FIG. 4 is a schematic cross-sectional view illustrating a main wing of an aircraft equipped with an airflow control system according to the fourth embodiment.

The airflow control system 70 of the fourth embodiment includes a fan 71 illustrated in FIG. 4 instead of the fan 14 that is the propeller fan of the first embodiment. The fan 71 in FIG. 4 is a cross flow fan. The fan 71 is provided on the upper surface of the trailing edge side of the main wing 7, provided on a trailing edge side of the blowout port 12, and also positioned closer to the trailing edge side than the structure 8 is. The fan 71 is provided to extend in the pitch direction of the main wing 7, takes the airflow from the leading edge side of the main wing 7, and also discharges the airflow toward the trailing edge side of the main wing 7. The fan 71 is provided inside the main wing 7, and a cover 72 is provided to cover the fan 71. The cover 72 is provided to face the main wing 7 and forms a fan channel 73 between the cover 72 and the main wing 7, through which the airflow flows. The cover 72 can be opened and closed. The cover 72 is opened outside the main wing 7 to form the fan channel 73 when the fan 71 is used. By contrast, the cover 72 is housed inside the main wing 7 to block the fan channel 73 when the fan 71 is not in use. In this case, the outer surface of the cover 72 is formed in a shape following the outer surface of the main wing 7 when the cover 72 is housed.

As described above, according to the fourth embodiment, the fan 71 can be a cross flow fan and the cover 72 can be provided. Therefore, the cover 72 can be opened and closed according to the usage conditions of the fan 71, so that the form of the fan 71 can be changed according to the intended use.

Fifth Embodiment

Figure 5:
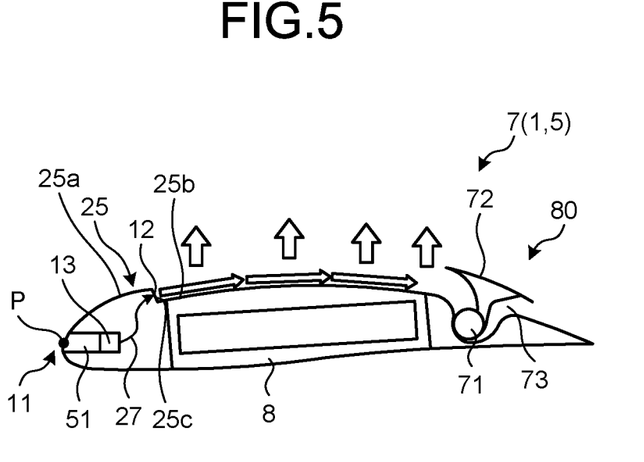
FIG. 5 is a schematic cross-sectional view illustrating a main wing of an aircraft equipped with an airflow control system according to a fifth embodiment.

Next, referring to FIG. 5, an airflow control system 80 according to a fifth embodiment will be described. In the fifth embodiment, also in order to avoid the redundant description, components that are different from those of the first to fourth embodiments will be described, and components that have the same configuration as those of the first to fourth embodiments will be described with the same reference numerals and signs. FIG. 5 is a schematic cross-sectional view illustrating a main wing of an aircraft equipped with an airflow control system according to the fifth embodiment.

The airflow control system 80 of the fifth embodiment, the fan 71 of the fourth embodiment is applied instead of the fan 14 of the airflow control system 50 of the second embodiment. Therefore, the airflow control system 80 of the fifth embodiment has a configuration similar to the configuration in which the airflow control system 50 of the second embodiment and the fan 71 of the fourth embodiment are combined, so that the description will not be repeated.

As described above, according to the fifth embodiment, even though the fan 71 of the fourth embodiment is applied to the airflow control system 50 of the second embodiment, the cover 72 can be opened and closed according to the usage conditions of the fan 71, so that the form of the fan 71 can be changed according to the intended use.

Sixth Embodiment

Figure 6:
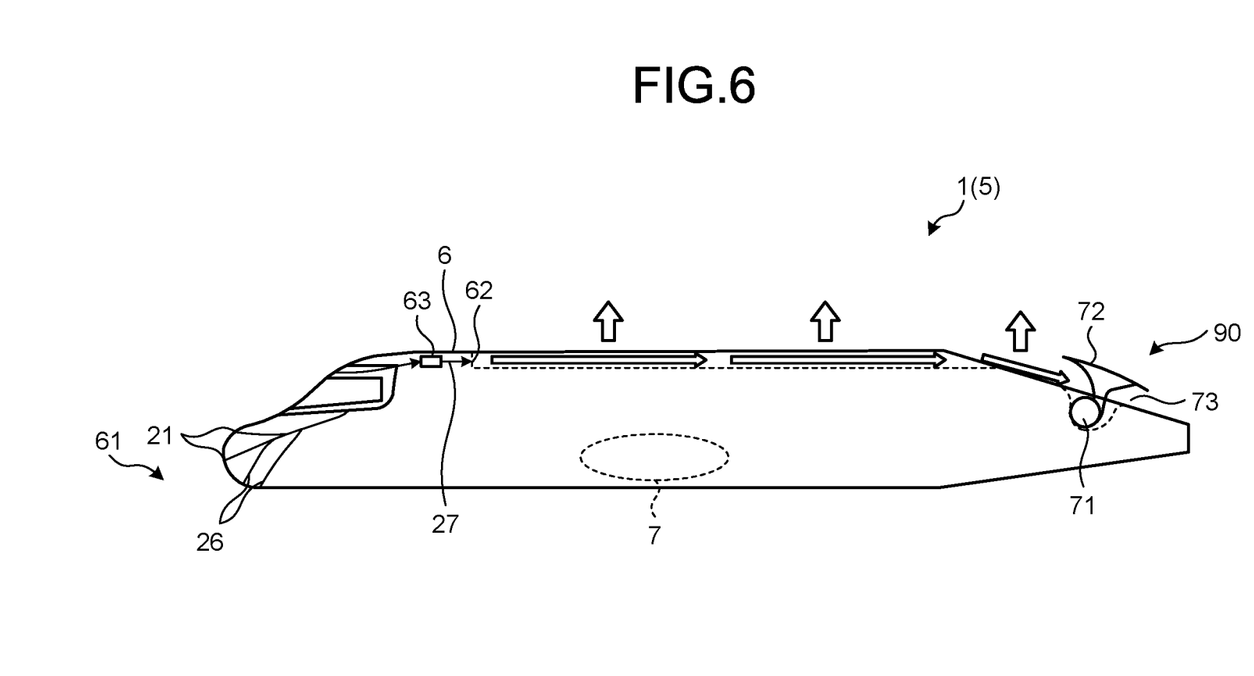
FIG. 6 is a schematic cross-sectional view illustrating a fuselage of an aircraft equipped with an airflow control system according to a sixth embodiment.

Next, referring to FIG. 6, an airflow control system 90 according to a sixth embodiment will be described. In the sixth embodiment, also in order to avoid the redundant description, components that are different from those of the first to fifth embodiments will be described, and components that have the same configuration as those of the first to fifth embodiments will be described with the same reference numerals and signs. FIG. 6 is a schematic cross-sectional view illustrating a fuselage of an aircraft equipped with an airflow control system according to the sixth embodiment.

In the airflow control system 90 of the sixth embodiment, the fan 71 of the fourth embodiment is applied instead of the fan 64 of the airflow control system 60 of the third embodiment. Therefore, the airflow control system 90 of the sixth embodiment has a configuration similar to the configuration in which the airflow control system 60 of the third embodiment and the fan 71 of the fourth embodiment are combined, so that the description will not be repeated.

As described above, according to the sixth embodiment, even though the fan 71 of the fourth embodiment is applied to the airflow control system 60 of the third embodiment, the cover 72 can be opened and closed according to the usage conditions of the fan 71, so that the form of the fan 71 can be changed according to the intended use.

Seventh Embodiment

Figure 7:
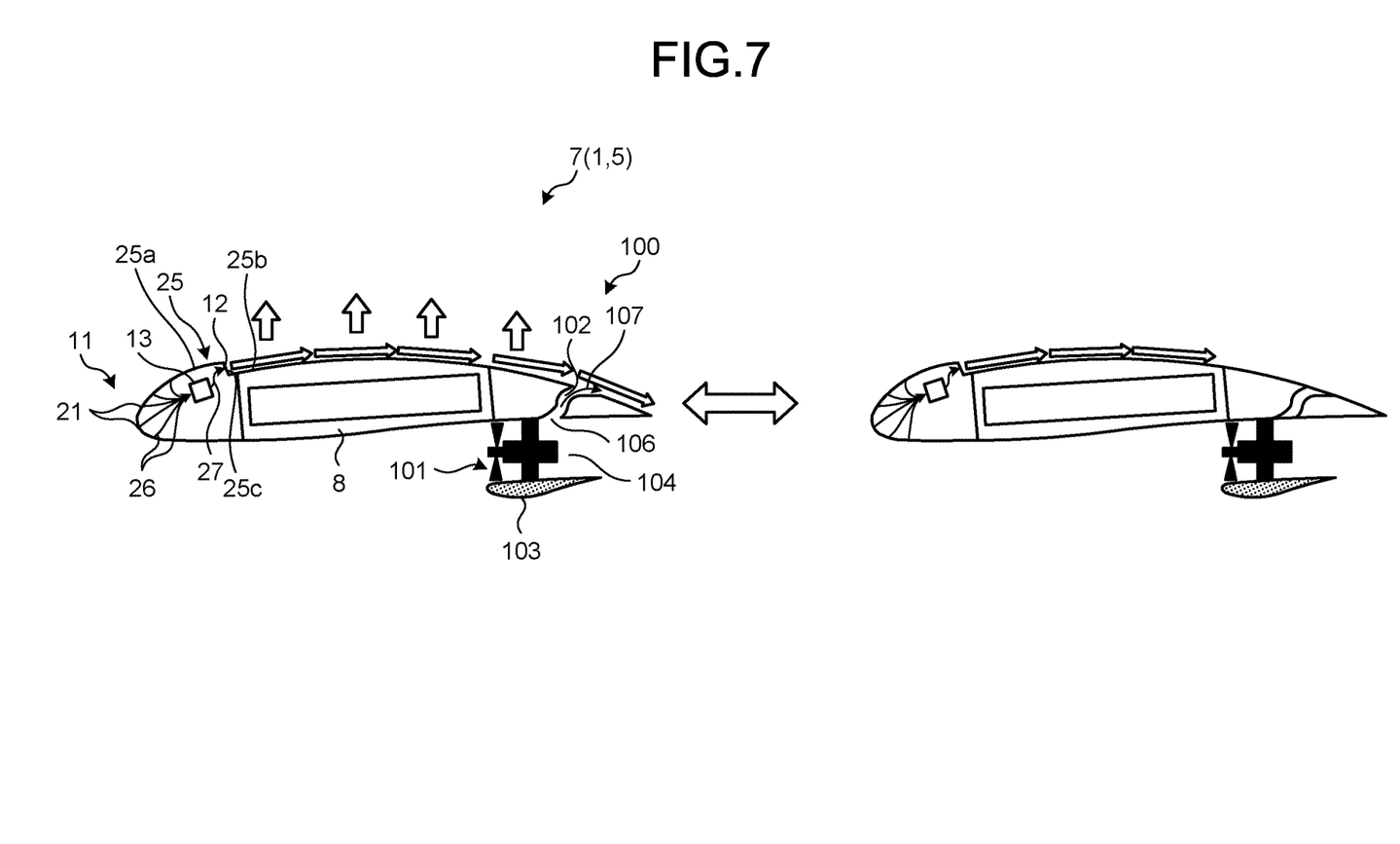
FIG. 7 is a schematic cross-sectional view illustrating a main wing of an aircraft equipped with an airflow control system according to a seventh embodiment.

Next, referring to FIG. 7, an airflow control system 100 according to a seventh embodiment will be described. In the seventh embodiment, also in order to avoid the redundant description, components that are different from those of the first to sixth embodiments will be described, and components that have the same configuration as those of the first to sixth embodiments will be described with the same reference numerals and signs. FIG. 7 is a schematic cross-sectional view illustrating a main wing of an aircraft equipped with an airflow control system according to the seventh embodiment.

The airflow control system 100 of the seventh embodiment further includes a fan 101 provided on the lower surface of the main wing 7 instead of the fan 14 of the airflow control system 10 of the first embodiment and a bypass duct 102 through which the lower surface of the main wing 7 communicates with the upper surface of the main wing 7.

The fan 101 is provided on the lower surface of the trailing edge side of the main wing 7 and is positioned closer to the trailing edge side than the structure 8 is. The fan 101 is, for example, a propeller fan. The fan 101 is provided between the main wing 7 and a cowl 103 that is provided to face the lower surface of the main wing 7. The cowl 103 has a cross-section that is cut in a plane perpendicular to the pitch direction and formed in a wing shape, and is provided with a fan channel 104 through which the airflow flows between the cowl 103 and the lower surface of the main wing 7.

The bypass duct 102 is a channel that connects an inlet port 106 provided on a trailing edge side of the fan 101 and an outlet port 107 provided on the trailing edge side of the blowout port 12. The inlet port 106 takes the airflow discharged from the fan 101. The outlet port 107 is provided on the upper surface of the trailing edge side of the main wing 7, and is positioned closer to the trailing edge side than the structure 8 is. The outlet port 107 is formed to blow out the airflow from the leading edge side of the main wing 7 to the trailing edge side of the main wing 7. The bypass duct 102 guides the airflow taken from the inlet port 106 toward the outlet port 107. The inlet port 106 and the outlet port 107 can be opened and closed, and the inlet port 106 and the outlet port 107 are opened when the fan 101 is in use, while the inlet port 106 and the outlet port 107 are closed when the fan 101 is not in use. Therefore, the inlet port 106 and the outlet port 107 can be opened and closed according to the usage conditions of the fan 101.

This airflow control system 100 sucks the outside air flowing into the fan channel 104 by the fan 101. The airflow control system 100 discharges the sucked outside air by the fan 101 from the downstream that is the air discharge side of the fan channel 104 to the outside. The airflow control system 100 takes the outside air discharged from the fan channel 104 from the inlet port 106. The airflow control system 10 blows out the taken outside air from the outlet port 107 through the bypass duct 102, as the airflow. In the airflow control system 100 causes the airflow blown out from the blowout port 12 and the airflow blown out from the outlet port 107 to be joined. As a result, in the airflow control system 100, by an ejector effect, the airflow blown out from the blowout port 12 is drawn by the airflow blown out from the outlet port 107 and discharged from the trailing edge of the main wing 7 toward the outside.

As described above, according to the seventh embodiment, since the fan 101 is not provided on the upper surface of the main wing 7, aerodynamic interference on the upper surface of the main wing 7 can be reduced, and the deterioration of aerodynamic performance of the main wing 7 can be suppressed.

In the seventh embodiment, a step may be formed on the lower surface of the main wing 7 on the trailing edge side of the fan 101, and the inlet port 106 may be formed on this step.

Eighth Embodiment

Figure 8:
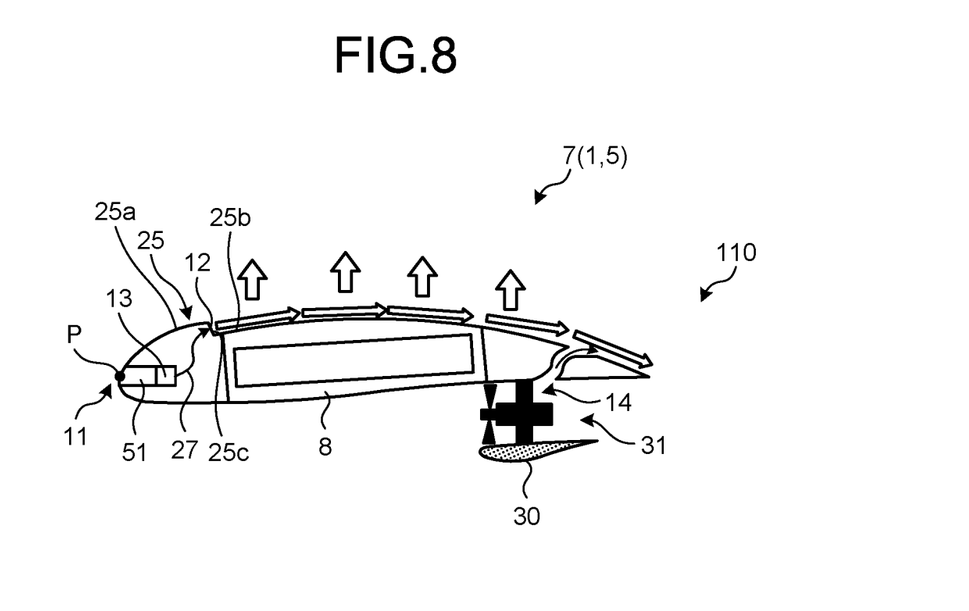
FIG. 8 is a schematic cross-sectional view illustrating a main wing of an aircraft equipped with an airflow control system according to an eighth embodiment.

Next, referring to FIG. 8, an airflow control system 110 according to an eighth embodiment will be described. In the eighth embodiment, also in order to avoid the redundant description, components that are different from those of the first to seventh embodiments will be described, and components that have the same configuration as those of the first to seventh embodiments will be described with the same reference numerals and signs. FIG. 8 is a schematic cross-sectional view illustrating a main wing of an aircraft equipped with an airflow control system according to the eighth embodiment.

In the airflow control system 110 of the eighth embodiment, the fan 101 and the bypass duct 102 of the seventh embodiment are applied instead of the fan 14 of the airflow control system 50 of the second embodiment. Therefore, the airflow control system 110 of the eighth embodiment has a configuration similar to the configuration in which the airflow control system 50 of the second embodiment and the fan 101 and the bypass duct 102 of the seventh embodiment are combined, so that the description will not be repeated.

As described above, according to the eighth embodiment, even in the case in which the fan 101 and the bypass duct 102 of the seventh embodiment are applied to the airflow control system 50 of the second embodiment, since the fan 101 is not provided on the upper surface of the main wing 7, aerodynamic interference on the upper surface of the main wing 7 can be reduced, and the deterioration of aerodynamic performance of the main wing 7 can be suppressed.

Ninth Embodiment

Figure 9:
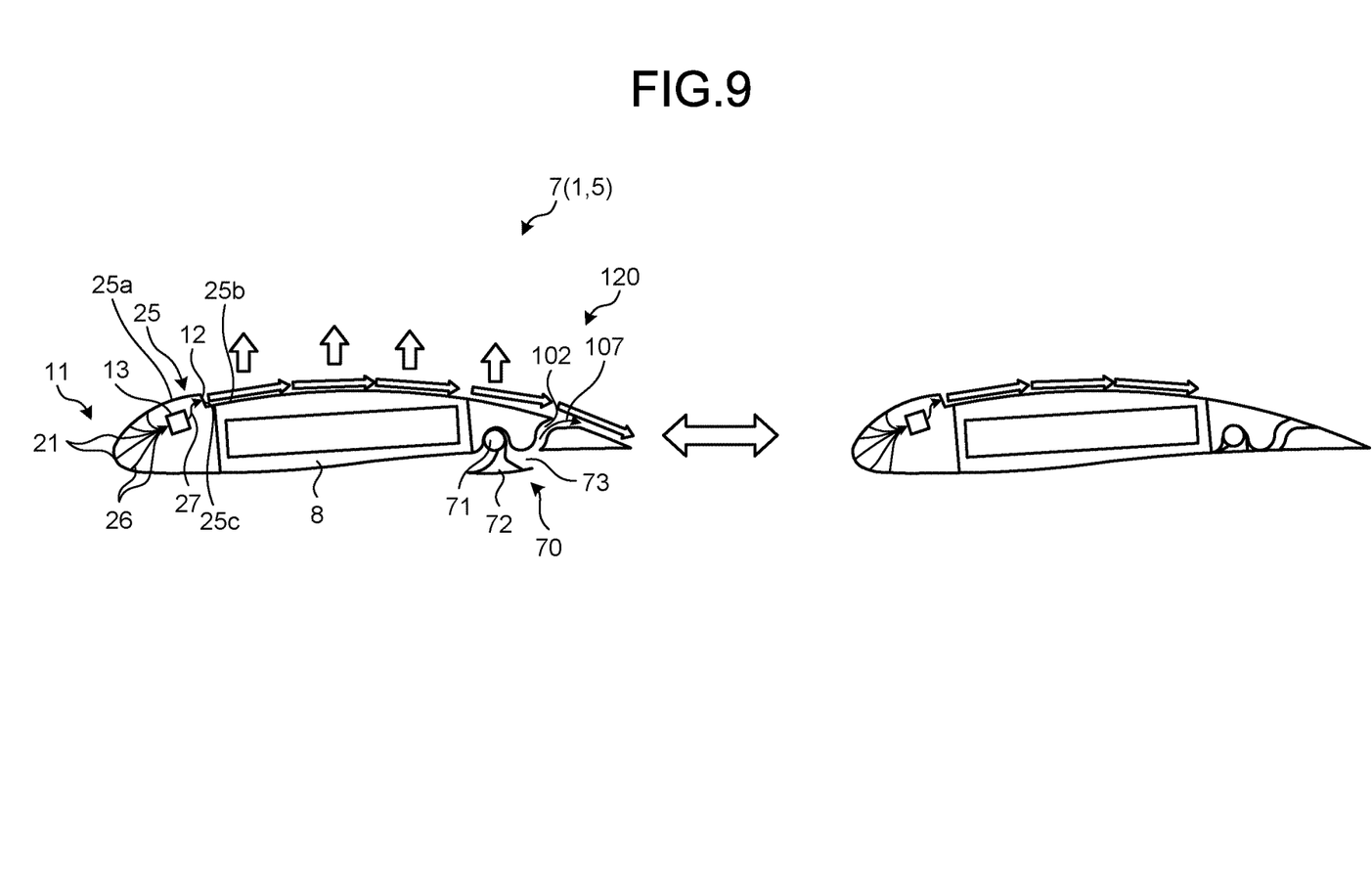
FIG. 9 is a schematic cross-sectional view illustrating a main wing of an aircraft equipped with an airflow control system according to a ninth embodiment.

Next, referring to FIG. 9, an airflow control system 120 according to a ninth embodiment will be described. In the ninth embodiment, also in order to avoid the redundant description, components that are different from those of the first to eighth embodiments will be described, and components that have the same configuration as those of the first to eighth embodiments will be described with the same reference numerals and signs. FIG. 9 is a schematic cross-sectional view illustrating a main wing of an aircraft equipped with an airflow control system according to the ninth embodiment.

In the airflow control system 120 of the ninth embodiment, the fan 71 of the fourth embodiment is applied instead of the fan 101 of the airflow control system 100 of the seventh embodiment. Therefore, the airflow control system 120 of the ninth embodiment has a configuration similar to the configuration in which the airflow control system 100 of the seventh embodiment and the fan 71 of the fourth embodiment are combined, so that the description will not be repeated.

As described above, according to the ninth embodiment, even in the case in which the fan 71 of the fourth embodiment is applied to the airflow control system 100 of the seventh embodiment, since the fan 71 is not provided on the upper surface of the main wing 7, aerodynamic interference on the upper surface of the main wing 7 can be reduced, and the deterioration of aerodynamic performance of the main wing 7 can be suppressed.

Tenth Embodiment

Figure 10:
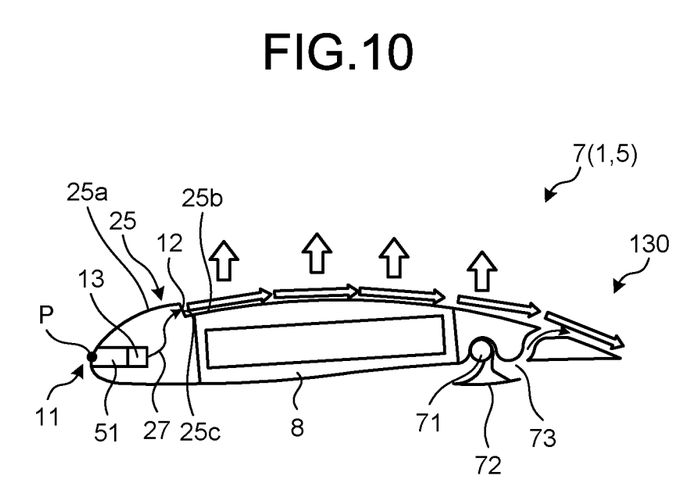
FIG. 10 is a schematic cross-sectional view illustrating a main wing of an aircraft equipped with an airflow control system according to a tenth embodiment.

Next, referring to FIG. 10, an airflow control system 130 according to a tenth embodiment will be described. In the tenth embodiment, also in order to avoid the redundant description, components that are different from those of the first to ninth embodiments will be described, and components that have the same configuration as those of the first to ninth embodiments will be described with the same reference numerals and signs. FIG. 10 is a schematic cross-sectional view illustrating a main wing of an aircraft equipped with an airflow control system according to the tenth embodiment.

In the airflow control system 130 of the tenth embodiment, the fan 71 of the fourth embodiment is applied instead of the fan 101 of the airflow control system 110 of the eighth embodiment. Therefore, the airflow control system 130 of the tenth embodiment has a configuration similar to the configuration in which the airflow control system 110 of the eighth embodiment and the fan 71 of the fourth embodiment are combined, so that the description will not be repeated.

As described above, according to the tenth embodiment, even in the case in which the fan 71 of the fourth embodiment is applied to the airflow control system 110 of the eighth embodiment, since the fan 71 is not provided on the upper surface of the main wing 7, aerodynamic interference on the upper surface of the main wing 7 can be reduced, and the deterioration of aerodynamic performance of the main wing 7 can be suppressed.

Eleventh Embodiment

Figure 11:
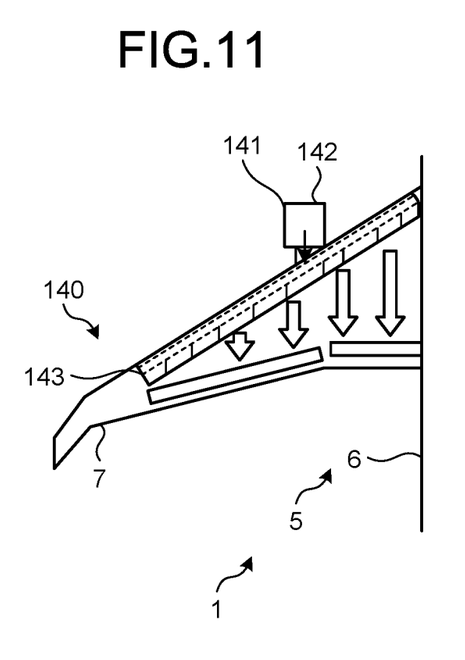
FIG. 11 is a schematic cross-sectional view illustrating a main wing of an aircraft equipped with an airflow control system according to an eleventh embodiment.
Figure 12:
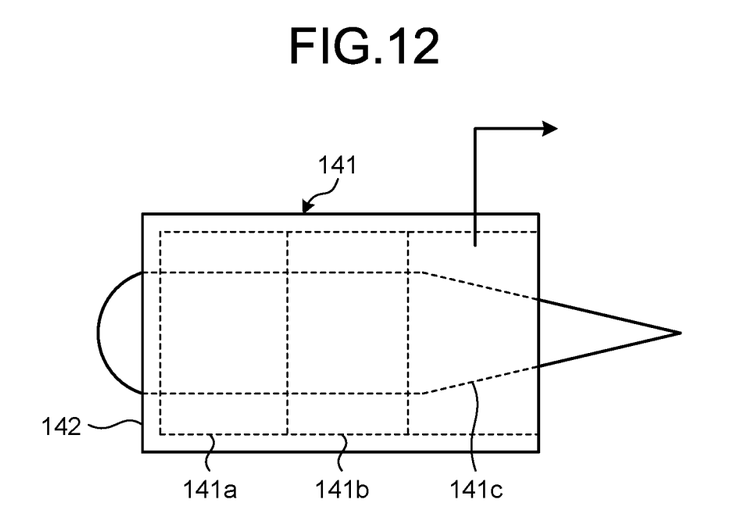
FIG. 12 is a schematic view illustrating an engine of an aircraft equipped with the airflow control system according to the eleventh embodiment.
Figure 13:
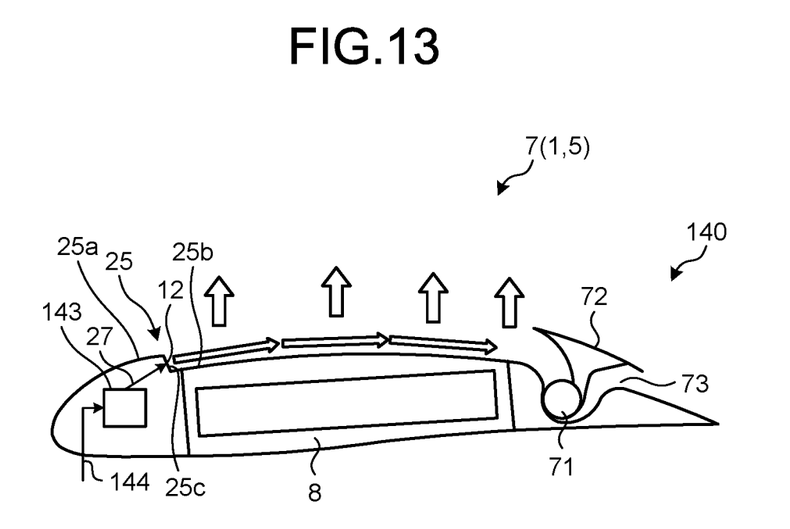
FIG. 13 is a schematic cross-sectional view illustrating the main wing of the aircraft equipped with the airflow control system according to the eleventh embodiment.

Next, referring to FIG. 11 to FIG. 13, an airflow control system 140 according to an eleventh embodiment will be described. In the eleventh embodiment, also in order to avoid the redundant description, components that are different from those of the first to tenth embodiments will be described, and components that have the same configuration as those of the first to tenth embodiments will be described with the same reference numerals and signs. FIG. 11 is a schematic cross-sectional view illustrating a main wing of an aircraft equipped with an airflow control system according to the eleventh embodiment. FIG. 12 is a schematic view illustrating an engine of an aircraft equipped with the airflow control system according to the eleventh embodiment. FIG. 13 is a schematic cross-sectional view illustrating the main wing of the aircraft equipped with the airflow control system according to the eleventh embodiment.

The airflow control system 140 of the eleventh embodiment is a system that uses an existing jet engine 141 in the aircraft 1.

The aircraft 1 includes the jet engine 141 that generates thrust. The jet engine 141 may be a turbofan engine or may be a turboshaft engine, and is not limited to any particular type. As illustrated in FIG. 12, the jet engine 141 is composed of an air intake port 142, a compression section 141a, a combustion section 141b, and an air discharge section 141c. The air intake port 142 is formed on the forward side of the jet engine 141 and takes outside air. That is, the air intake port 142 functions as a suction port to suck the outside air. In the compression section 141a, the pressure of the outside air taken from the air intake port 142 is increased, and the air compressed by increasing the pressure is pressure-fed to the combustion section 141b. In the combustion section 141b, the compressed air is mixed with combustion to combust, and the combustion gas that has combusted is discharged to the air discharge section 141c. The air discharge section 141c generates thrust by discharging the combustion gas from the combustion section 141b as an exhaust gas. Here, a part of the exhaust gas discharged from the air discharge section 141c is bled and used in the airflow control system 140. That is, the jet engine 141 functions as a compressor that increases the pressure of the outside air and pressure-feeds the outside air.

As illustrated in FIG. 13, the airflow control system 140 of the eleventh embodiment includes the jet engine 141, a chamber 143, the blowout port 12, and the fan 71. Since the blowout port 12 has a configuration similar to the configuration as in the first embodiment, and the fan 71 has a configuration similar to the configuration as in the fourth embodiment, the description will not be repeated.

The chamber 143 is provided on the main wing 7 and provided to extend in the pitch direction. The exhaust gas bled from the jet engine 141 described above flows into the chamber 143 through a bleed air pipe 144. In the chamber 143, a temperature of the flowing exhaust gas is equalized. The exhaust gas whose temperature is equalized in the chamber 143 is then supplied to the blowout port 12 through the air discharge side pipe 27.

This airflow control system 140 sucks the outside air from the air intake port 142 of the jet engine 141. In the airflow control system 140, a part of the exhaust gas discharged from the jet engine 141 is bled, and introduced into the chamber 143 through the bleed air pipe 144. The airflow control system 140 blows out the exhaust gas flowing into the chamber 143 from the blowout port 12 through the air discharge side pipe 27, as the airflow. The blown airflow flows from the leading edge side toward the trailing edge side along the upper surface of the main wing 7, thereby improving the lift characteristics of the main wing 7. The airflow control system 140 sucks the airflow flowing into the fan channel 73 by the fan 71. The airflow control system 140 discharges the sucked airflow by the fan 71 from the downstream that is an air discharge side of the fan channel 73 to the outside.

As described above, according to the eleventh embodiment, since the existing jet engine 141 can be used, the configuration in which the compressor is not included can be employed, so that the system can be simplified The airflow control systems 10, 50, 60, 70, 80, 90, 100, 110, 120, 130, and 140, and the aircraft 1 described in individual embodiments are understood, for example, as follows.

The airflow control system 10, 50, 60, 70, 80, 90, 100, 110, 120, 130, or 140 according to a first aspect is an airflow control system 10, 50, 60, 70, 80, 90, 100, 110, 120, 130, or 140 to control airflow that flows over the upper surface of the aircraft 1, and includes the blowout port 12 or 62 that is provided on the forward side of the upper surface of the aircraft 1 and blows out the airflow, the suction port 11, 61, or 142 that is provided closer to the forward side than the blowout port 12 or 62 is and sucks the outside air, the fan 14, 64, 71, or 101 that is provided on the rearward side of the blowout port 12 or 62, sucks air flowing from the forward side, and also discharges the air to the rearward side, and the compressor 13, 63, or 141 that is provided in a channel extending from the suction port 11, 61, or 142 to the blowout port 12 or 62, increases the pressure of the outside air sucked from the suction port 11, 61, or 142, and pressure-feeds the outside air to the blowout port 12 or 62.

According to this configuration, the channel pipes (the air intake side pipe 26 and the air discharge side pipe 27) between the suction port 11, 61, or 142, and the blowout port 12 or 62 can be shortened. As a result, the flow resistance can be reduced, and the increase in the pressure loss in the pipes can be suppressed. Therefore, the increase in the discharge capacity of the compressor 13, 63, or 141 can be suppressed. Thus, since the increase in weight of the pipes and the increase in weight of the compressor 13, 63, or 141 can be suppressed, the deterioration of the fuel consumption of the aircraft 1 can be suppressed. In addition, since the airflow flows along the upper surface of the aircraft 1, the lift characteristics can be improved.

As a second aspect, the suction port 11 has a porous structure with the plurality of suction holes 21, and the suction holes 21 are provided over from the upper surface side to the lower surface side on the forward side of the aircraft 1.

According to this configuration, since the boundary layer formed on the forward side of the aircraft 1 can be sucked by the plurality of suction holes 21, aerodynamic drag on the aircraft 1 can be suppressed.

As a third aspect, the suction port 61 is a suction opening provided on the forward side of the aircraft 1, and in a case in which the suction opening is not provided, assuming that a point where the airflow diverges to the upper surface side and the lower surface side on the forward side of the aircraft 1 is the virtual stagnation point P, the suction opening is provided at the virtual stagnation point P.

According to this configuration, since the stagnation point is not generated on the forward side of the aircraft 1, aerodynamic drag on the aircraft 1 can be suppressed.

As a fourth aspect, the fan 14 or 64 is a propeller fan.

According to this configuration, a general-purpose fan can be used.

As a fifth aspect, the fan 71 is a cross flow fan.

According to this configuration, the fan 71 can be a cross flow fan and the cover 72 can be provided. Therefore, the cover 72 can be opened and closed according to the usage conditions of the fan 71, so that the form of the fan 71 can be changed according to the intended use.

As a sixth aspect, the fan 101 is provided on the lower surface side of the aircraft 1, and the inlet port 106 provided on the lower surface of the aircraft 1 and provided on the rearward side of the fan 101, the outlet port 107 provided on the upper surface of the aircraft 1 and provided on the rearward side of the blowout port 12 or 62, and the bypass duct 102 that is a channel connecting the inlet port 106 and the outlet port 107 are further included.

According to this configuration, since the fan 101 is not provided on the upper surface of the aircraft 1, aerodynamic interference on the upper surface of the aircraft 1 can be reduced, and the deterioration of aerodynamic performance of the aircraft 1 can be suppressed.

In a seventh aspect, the aircraft 1 includes the jet engine 141 that generates thrust, the suction port is the air intake port 142 provided in the jet engine 141, the compressor is the jet engine 141, and the blowout port 12 or 62 blows out a part of discharged air bled from the jet engine 141, as the airflow.

According to this configuration, since the existing jet engine 141 can be used, the configuration in which the compressor is not included can be employed, so that the system can be simplified An eighth aspect of the aircraft 1 includes the above-mentioned airflow control system 10, 50, 60, 70, 80, 90, 100, 110, 120, 130, or 140, and the aircraft main body 5 equipped with the airflow control system 10, 50, 60, 70, 80, 90, 100, 110, 120, 130, or 140.

According to this configuration, since the airflow control system 10, 50, 60, 70, 80, 90, 100, 110, 120, 130, or 140 can be mounted on the aircraft main body 5, the lift characteristics of the aircraft main body 5 can be improved while suppressing the increase in weight of the aircraft main body 5.

As a ninth aspect, the aircraft main body 5 includes the fuselage 6 and the main wing 7 provided on the fuselage 6, and the airflow control system 10, 50, 60, 70, 80, 90, 100, 110, 120, 130, or 140 is provided on the main wing 7.

According to this configuration, since the airflow control system 10, 50, 60, 70, 80, 90, 100, 110, 120, 130, or 140 can be mounted on the main wing 7, the lift characteristics of the main wing 7 can be improved while suppressing the increase in weight of the main wing 7.

As a tenth aspect, the aircraft main body 5 includes the fuselage 6 and the main wing 7 provided on the fuselage 6, and the airflow control system 10, 50, 60, 70, 80, 90, 100, 110, 120, 130, or 140 is provided on the fuselage 6.

According to this configuration, since the airflow control system 10, 50, 60, 70, 80, 90, 100, 110, 120, 130, or 140 can be mounted on the fuselage 6, the lift characteristics of the fuselage 6 can be improved while suppressing the increase in weight of the fuselage 6.

REFERENCE SIGNS LIST

1 Aircraft
5 Aircraft main body
6 Fuselage
7 Main wing
8 Structure
10 Airflow control system
11 Suction port
12 Blowout port
13 Compressor
14 Fan
21 Suction hole
25 Step
26 Air intake side pipe
27 Air discharge side pipe
30 Cowl
31 Fan channel
50 Airflow control system (second embodiment)
51 Suction port
P Virtual stagnation point
60 Airflow control system (third embodiment)
61 Suction port
62 Blowout port
63 Compressor
64 Fan
70 Airflow control system (fourth embodiment)
71 Fan
72 Cover
73 Fan channel
80 Airflow control system (fifth embodiment)
90 Airflow control system (sixth embodiment)
100 Airflow control system (seventh embodiment)
101 Fan
102 Bypass duct
103 Cowl
104 Fan channel
106 Inlet port
107 Outlet port
110 Airflow control system (eighth embodiment)
120 Airflow control system (ninth embodiment)
130 Airflow control system (tenth embodiment)
140 Airflow control system (eleventh embodiment)
141 Jet engine
142 Air intake port
143 Chamber
144 Bleed air pipe

The invention claimed is:

1. An airflow control system for controlling airflow flowing over an upper surface of a main wing of an aircraft, the airflow control system comprising:
   a blowout port that is provided on the upper surface of the main wing on a leading edge side of the main wing to blow out the airflow;
   a suction port that is provided on a leading edge of the main wing and farther forward on the main wing than the blowout port to suck outside air;
   a fan that is provided on a trailing edge side of the main wing and closer to a trailing edge of the main wing than the blowout port to suck air flowing from the leading edge side of the main wing and to discharge the air to the trailing edge side of the main wing, the fan being provided on an outer surface of the main wing; and
   a compressor that is provided in a channel extending from the suction port to the blowout port to increase pressure of the outside air sucked from the suction port and to pressure-feed the resulting outside air to the blowout port.

2. The airflow control system according to claim 1, wherein
   the suction port has a porous structure with a plurality of suction holes, and
   the plurality of suction holes are provided from an upper surface side of the main wing to a lower surface side of the main wing on the leading edge side of the main wing.

3. The airflow control system according to claim 1, wherein the fan is a propeller fan.

4. The airflow control system according to claim 1, wherein the fan is a cross flow fan.

5. The airflow control system according to claim 1, wherein
   the fan is provided on a lower surface of the main wing, and
   the airflow control system further comprises
      an inlet port that is provided on the lower surface of the main wing and is provided on a rearward side of the fan,
      an outlet port that is provided on an upper surface of the main wing and is provided on a rearward side of the blowout port, and
      a bypass duct that is a channel connecting the inlet port and the outlet port.

6. An aircraft comprising:
   the airflow control system according to claim 1; and
   an aircraft main body equipped with the airflow control system.

* * * * *